Nov. 28, 1967  V. JANIS, JR., ET AL  3,354,587
GRINDING MACHINE CONTROL SYSTEM
Filed June 2, 1964  2 Sheets-Sheet 1
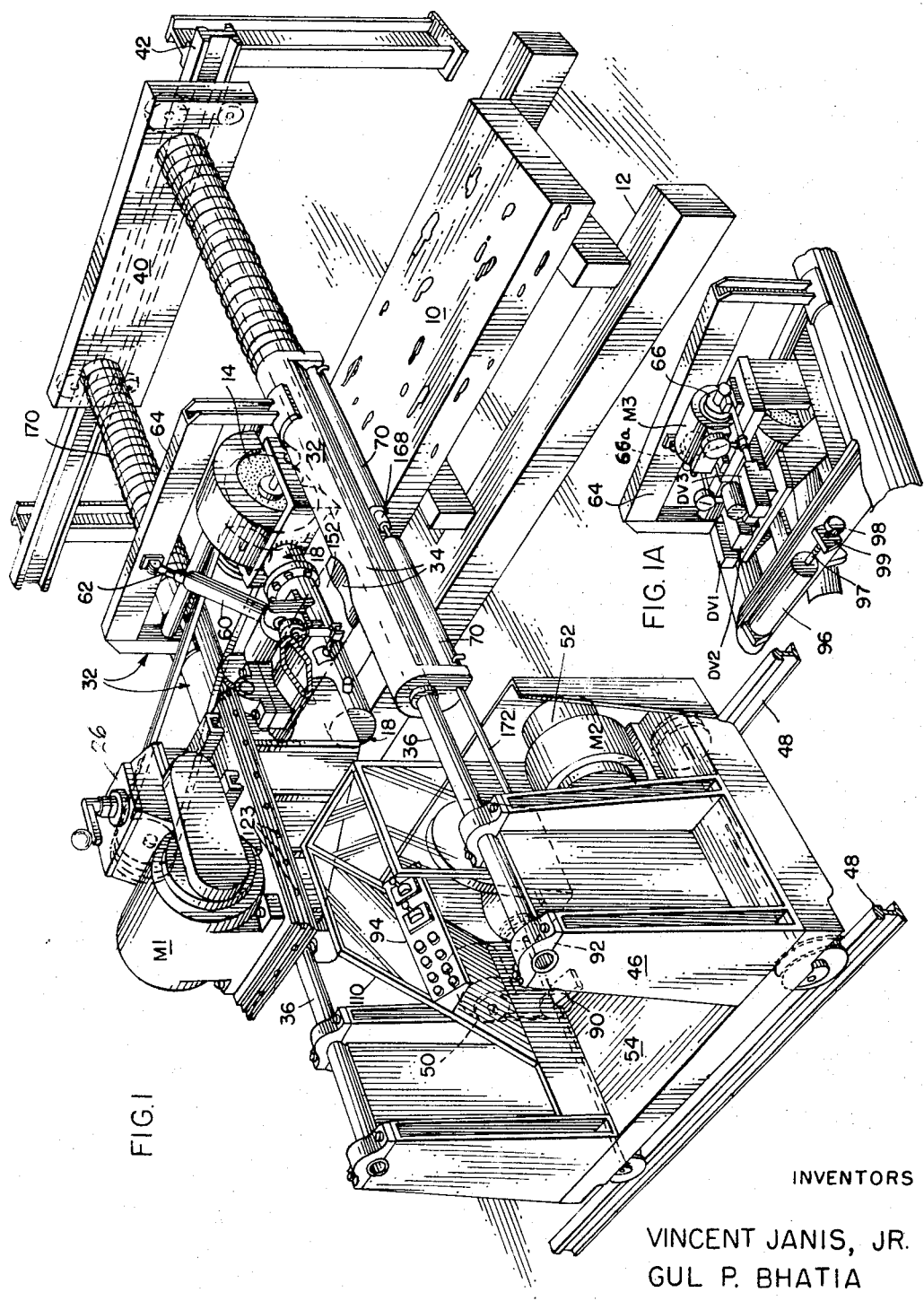
INVENTORS
VINCENT JANIS, JR.
GUL P. BHATIA
BY
ATT'Y

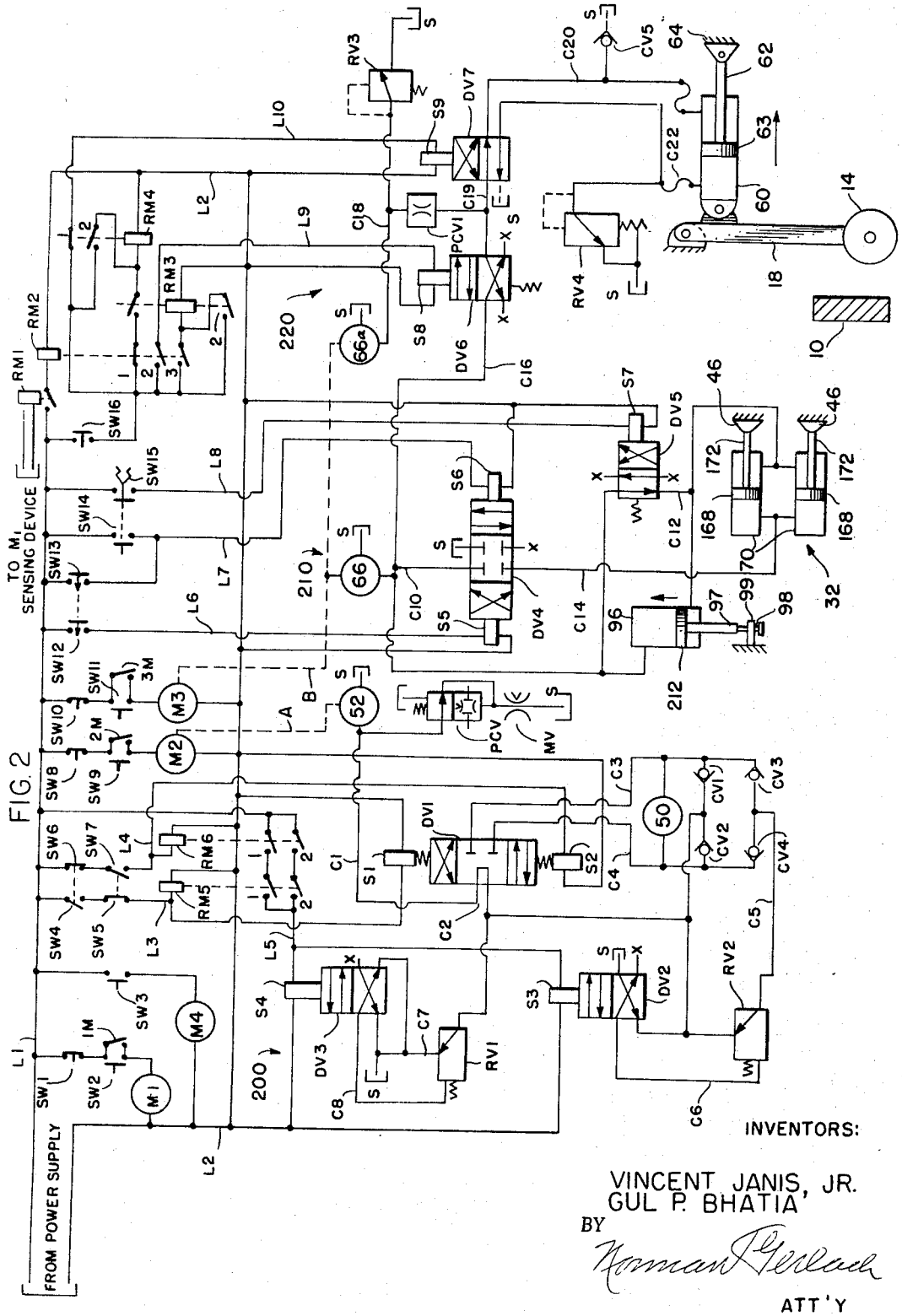

United States Patent Office 3,354,587
Patented Nov. 28, 1967

---

3,354,587
GRINDING MACHINE CONTROL SYSTEM
Vincent Janis, Jr., and Gul P. Bhatia, Park Ridge, Ill., assignors to Pettibone Mulliken Corporation, Chicago, Ill., a corporation of Delaware
Filed June 2, 1964, Ser. No. 372,032
10 Claims. (Cl. 51—35)

This invention relates in general to a system for operating a grinding machine of the type that is illustrated and described in detail in United States Patent No. 3,253,368, granted on May 31, 1966 and entitled "Surface Conditioning Grinding Machine," and more particularly to improvements whereby the grinding wheel of the machine is adapted to be automatically indexed for a predetermined distance across the work and both the means for moving the wheel along the work and the means for holding the wheel in engagement with the work are adequately and properly controlled.

The aforementioned patent discloses an improved grinding machine for conditioning the surfaces of billets, ingots and slabs or the like by removal of surface scale, seams, cracks and inclusions or other surface imperfections. In the machine of the application, a wheel-equipped carriage at one side of the billet or other workpiece to be ground and a tailstock at the other side of the workpiece are adapted to be reciprocated along the length of the workpiece by an operator who rides in a cab on the carriage. Another carriage having a boom is carried on the machine between the operator's carriage and the tailstock, and a rotary, motor-driven grinding wheel is carried by the boom so that it overlies the workpiece. The boom-equipped carriage is adapted to be traversed across the width of the workpiece, and the boom is pivotally mounted so that it is capable of bringing the wheel into engagement with the workpiece or lifting it therefrom. Thus, movement of the operator's carriage serves to move the wheel longitudinally along the workpiece and movement of the boom carriage serves to move the wheel across the width of the workpiece.

The grinding wheel rotates about an axis that is substantially parallel to the longitudinal axis of the workpiece; and it is carried along the length of the workpiece by the boom carriage during a grinding pass in response to the joint movement of the operator's carriage and the tailstock. In order to traverse successive areas of the workpiece after each successive longitudinal pass, the boom carriage and the wheel are indexed along the width of the workpiece at the end of each preceding longitudinal pass and, thereafter, the wheel is moved in the opposite direction along the length of the workpiece on the successive pass.

While it is occasionally desirable for the grinding machine operator manually to control the distance which the wheel may be indexed across the workpiece, it is extremely difficult for the operator who is some distance from the workpiece and the wheel to control the indexing so that adjacent areas of the workpiece are ground on each pass. Thus, if the indexing operation is under manual control, one indexing operation may result in insufficient indexing movement of the wheel, while another indexing operation may result in too large an indexing movement of the wheel. In one case, therefore, portions of the same workpiece area may be ground on successive passes, while in the other case, unground workpiece areas will remain, and in order to avoid these conditions, the operator is required to give considerable time and attention to manipulating the machine during each indexing operation. Therefore, in order properly to index the wheel and make certain that properly spaced adjacent surface areas of the workpiece are ground in each longitudinal grinding pass, it is desirable that the boom carriage and the wheel be automatically indexed for a predetermined increment at the option of the operator.

Since the area of the work which is to be ground on each longitudinal pass of the wheel will vary in accordance with the characteristics of the workpiece and the parameters of the wheel, it is further desirable to make possible the selection of the predetermined increment through which the wheel will be indexed after each longitudinal pass.

It is one object of the present invention to provide a novel and improved system for controlling a grinding machine of the aforementioned character.

It is another object of the present invention to provide an arrangement for automatically indexing the grinding wheel of a grinding machine a predetermined increment across the workpiece to enable the proper spacing of successive ground areas of the workpiece.

It is yet another object of the invention to provide an arrangement whereby the operator may select any one of a plurality of predetermined increments through which the grinding wheel may be automatically indexed for grinding successive areas of the workpiece.

As mentioned previously, the operator's carriage is moved longitudinally along the workpiece to carry both the boom-equipped carriage and the grinding wheel therewith. In order to move the operator's carriage back and forth, a reversible fluid motor is utilized, and such motor may be driven in either of two directions in order to move the operator's carriage accordingly. During back and forth movement of the operator's carriage, the speed at which the reversible fluid motor is driven must be regulated in order to control the speed of movement of the boom-equipped carriage, while braking of the operator's carriage must be provided in order accurately to control the position of the wheel or terminate its movement along the workpiece.

In order to drive the fluid motor in a desired direction, two conduits are connected to the motor alternatively connectable to a source of fluid under pressure. Depending on which conduit is connected to the source, the other conduit serves as a relief conduit for the fluid passing through the motor. Under these circumstances, when the flow of fluid under pressure through the conduits are reversed quickly to brake the movement of the operator's carriage or to drive such carriage in the opposite direction, the inertia of the moving parts of the grinder as a whole builds up pressure in the one conduit leading to the fluid motor and exhausts the other conduit. This leads to undesirable cavitation and shock in the system.

It is a still further object of the present invention to provide improved arrangements for controlling the speed of movement and the braking of the operator's carriage of a grinding machine of the type under consideration.

It is another object of the invention to provide an improved arrangement or system for braking the movement of a fluid-driven grinding machine carriage without cavitation or shock in a machine of the aforementioned type.

In the operation of a grinding machine of the type under consideration, the rotary grinding wheel is lowered into engagement with the workpiece under downwardly exerted hydraulic pressure and it is thereafter held against the workpiece under pressure. To prevent shattering or damaging of the wheel when it engages the workpiece, the initial downward speed of travel is limited to a predetermined value. The contour of the workpiece is usually somewhat undulatory in nature and, therefore, as the wheel moves along the workpiece, it will occasionally encounter high or low spots. Therefore, in order to insure that the workpiece is smoothly or evenly ground, it is desirable automatically to supply additional hydraulic fluid for a downward slope and relieve hydraulic fluid for an upward slope, thus holding the grinding wheel in constant contact with the workpiece.

In the aforementioned patent application, a situation is described wherein the rotary grinding wheel passes over the end of the workpiece at the end of a longitudinal grinding pass and then falls under the influence of the hydraulic pressure since the back pressure or support that is afforded by the upper surface of the workpiece is no longer present. If the movement of the operator's carriage is then reversed without raising the grinding wheel, the side of the wheel engages the adjacent end of the workpiece with consequent shattering of or damage to the wheel. To avoid this result, the aforementioned patent application describes electrical and hydraulic safety circuit arrangements for automatically sensing the drop of the wheel on moving past the adjacent end of the workpiece and immediately raising the wheel to prevent its engagement with the workpiece when travel or movement of the operator's carriage is reversed. It is, therefore, desirable to utilize components of the safety circuit for automatically supplying the required additional pressure on the wheel and for automatically raising the wheel in the event it should fall from the workpiece.

As already mentioned, the contour of the workpiece to be ground is often undulating in character. The grinding wheel in passing over the upper surface of the workpiece may, therefore, encounter high spots which tend to force the wheel upwards and thereby create a pressure in a portion of the hydraulic system that controls the upward movement of the wheel. Since this pressure must be eliminated before the wheel can move upward and since such movement should be initiated with minimum delay, when necessary, it is desirable automatically to relieve the pressure of the fluid immediately upon its occurrence.

Another object of the present invention is to provide means whereby the wheel is lowered into engagement with the workpiece under a predetermined safe hydraulic pressure and thereafter automatically subjected to increased downward pressure in response to the increased load that is encountered by the wheel on engaging the workpiece.

It is a further object of the present invention to provide an arrangement whereby a certain electrical arrangement which is described in detail in aforementioned patent application Serial No. 314,706 and serves to control the automatic raising of the grinding wheel in response to its falling on passing the adjacent end of the workpiece at the end of a longitudinal pass of the wheel over the workpiece is utilized to increase the downward hydraulic pressure against the wheel in response to the wheel encountering increased upward resistance.

Briefly, the system or means whereby the aforementioned objects are accomplished includes an hydraulic circuit for moving the operator's carriage back and forth lengthwise of the workpiece, an hydraulic circuit for reciprocating the boom carriage across the width of the workpiece and an hydraulic circuit for swinging the boom downwards and upwards in order to bring the grinding wheel into or out of engagement with the workpiece. These circuits include directional valves which are under control of respective solenoids and operate to effect movement of the operator's carriage, the boom-equipped carriage and the grinding wheel in a desired direction depending on which solenoids are energized or actuated by the operator.

The previously mentioned reversible fluid motor is controlled by a directional valve in the hydraulic circuit for moving the operator's carriage back and forth lengthwise of the workpiece. Such valve reverses or switches the flow of fluid under pressure through the mentioned conduits between the fluid pressure source and the motor in order to cause the motor to be driven in a desired direction. The speed of the motor is regulated by an adjustable pressure control valve which is connected to the supply conduit between the motor and the source of fluid under pressure. This controls the volume of motive fluid applied to the motor and, therefore, the latter's speed. If the flow of fluid under pressure in the conduits is suddenly reversed, the inertia of the mass causes a build up of pressure in the conduit that is connected to the fluid pressure source. Thus, the pressure in such conduit builds up to a high value which serves to brake the fluid motor and resultantly movement of the entire grinding machine. By use of an appropriate relief and check valve arrangement, this built-up pressure is maintained under control and applied to fill the relief conduit to prevent cavitation. According to the present invention, this relief valve is actuated to produce a controlled deceleration followed by acceleration in the opposite direction.

According to the present invention, the hydraulic circuit for controlling the movement of the boom carriage across the width of the workpiece includes a metering cylinder which serves to control the increment through which the boom carriage may be indexed across the work. The stroke of the metering cylinder, in turn, is adjustable so that any one of a plurality of different increments may be selected in accordance with the needs of the situation as determined by the operator of the machine. In addition, electrical circuits under control of the operator are provided for enabling the operator to utilize the metering cylinder or not when traversing the boom carriage across the workpiece.

The downward pressure that holds the wheel engaged with the workpiece is applied to one side of a fixed differential piston having associated therewith a movable cylinder which is connected to the boom that supports the grinding wheel. Fluid under pressure applied to the other side of the piston serves to raise the cylinder, the boom and the wheel. If the wheel in moving over the workpiece encounters a high spot, the cylinder moves upwards against the downward pressure, as already mentioned, thereby creating a vacuum on the other side of the piston. By use of a simple check valve between said other side of the piston and the fluid supply or sump, this vacuum may be controlled. Thus, the check valve is enabled to open in response to the creation of the vacuum and serves to supply additional fluid to the other side of the piston.

Numerous other objects and advantages of the invention which have heretofore not been enumerated will become apparent from a consideration of the following detailed description. In the accompanying two sheets of drawings forming a portion of this specification, one illustrative embodiment of the invention is illustrated.

In such drawings:

FIG. 1 is a front perspective view of a grinding machine in which the principles of the present invention are employed;

FIG. 1A is an enlarged fragmentary perspective view illustrating the crosshead that supports one end of the boom cyinder, and also certain control apparatus that is carried by the boom carriage assembly of the grinding machine; and FIG. 2 illustrates the electrical and hydraulic circuits that are utilized in the machine of FIG. 1 and serve to accomplish the objectives of the present invention.

*General description of the grinding machine*

Referring now to FIGS. 1 and 1A, there is shown the particular grinding machine that is illustrated and described in my aforementioned patent application Serial No. 314,706. Such machine is adapted to grind or surface a workpiece, such, for example, as a billet 10. Certain machine parts and components that are not necessary to the comprehension of the invention have been omitted from the drawings for purposes of clarity. Wherever believed feasible, the grinding machine parts and components as indicated in FIGS. 1 and 1A and also FIG. 2 are identified by the same reference characters as those used in the aforementioned patent application.

The billet 10 is carried by a supporting structure 12 at a desired height above the floor of the establishment where the grinding machine is employed and operated. The upper surface of the billet is adapted to be conditioned or ground by a rotary, power-driven grinding wheel 14 in order to remove from it surface scale and other imperfections. The wheel 14 is rotatably supported on the distal end of a boom 18 above the billet 10 and is adapted to be rotated by an electric motor M1 at any one of a number of desired speeds through the medium of a variable speed power transmission unit 26. An electric motor M4 and certain mechanical operating parts serve to rock or tilt the grinding wheel sidewise.

The boom 18 is pivotally supported on a boom carriage assembly 32 in such manner that the wheel 14 may be swung into or out of engagement with the billet 10. Swinging of the boom and the grinding wheel is effected by way of an hydraulic boom cylinder 60 which has one end pivotally connected to the boom 18. A piston 63 is slidably mounted in the cylinder 60 and is provided with a fixed piston rod which extends through the other end of the cylinder and has its outer end pivotally connected to a horizontal crosshead 64 on the boom assembly 32. The cylinder 60 is of the reaction type and is adapted for boom-swinging purposes, to be moved in response to the supply of fluid under pressure to the piston 63 (see FIG. 2). A fluid pump 66a (see FIG. 1A) is supported in any conventional manner on the grinding machine and serves to supply fluid under pressure to the cylinder 60 under control of an electric motor M3.

The boom carriage assembly 32 comprises a horizontally extending H-shaped casting 34. The crosshead 64 extends over and is suitably supported on the right-hand ends of parallel side arms of the casting 34 as viewed in FIG. 1. The casting 34 is slidable on two horizontally extending, spaced apart guide tubes 36 which overlie and extend transversely across the billet 10 on the supporting structure 12. Said right-hand ends of the guide tubes 36 are fixedly connected to a tailstock carriage 40 and the left-hand ends of the guide tubes as viewed in FIG. 1 are fixedly connected to an operator's carriage 46. The boom carriage assembly 32 is adapted to be shifted bodily in either direction along the guide tubes 36 by a pair of hydraulic cylinders 70 under the side arms of the H-shaped casting 34 of the boom carriage assembly. The cylinders 70 are of the reaction type and are adapted to be moved in response to the application of fluid under pressure to respective pistons 168 therein (see FIG. 2). Fluid under pressure is supplied to the cylinders 70 from a fluid pump 66 under control of the aforementioned electrical motor M3. The pistons 168 in the cylinders 70 are fixedly connected to certain ends of horizontally extending reaction rods 172, the other ends of which project towards and are fixedly connected to the operator's carriage 46. The cylinders 70, when supplied with fluid under pressure by the pump 66, are thus adapted to move the boom carriage assembly 32 transversely across the billet 10.

A metering cylinder 96 (see FIG. 1A) for controlling the increment through which the cylinders 70 are moved is also carried by the boom carriage assembly 32. The metering cylinder 96 is associated with the pump 66 and has a piston 212 (illustrated diagrammatically in FIG. 2) and it is fixedly connected to one end of a horizontally extending piston rod 97 (see FIG. 1A). The piston rod 97 and the piston 212 are adapted, in response to the application of fluid under pressure to the piston 212, to move for a distance corresponding to the setting of a stop screw 98 on a bracket 99.

The tailstock carriage 40 is movable on a horizontal rail 42 along the length of the billet 10 and adjacent one side of the billet while the operator's carriage 46 is movable on a pair of rails 48 along the length of the billet 10 and adjacent the other side of said billet. The carriage 46 and tailstock carriage 40 are adapted to be driven by a fluid motor 50 which is mounted on the operator's carriage. Fluid under pressure is supplied to the fluid motor 50 from a fluid pump 52 under control of an electrical motor M2. The carriage 46 supports a cab 54 in which the operator rides. Foot pedals 90 and 92 together with a series of push-button and lever-controlled switches on a control console 94 are provided for enabling the operator to control the movements of the carriage 46, the boom carriage assembly 32, the boom 18, and the grinding wheel 14, as will be explained hereafter.

*Electrical circuitry of control system*

In FIG. 2 the electrical and hydraulic circuits for controlling the grinding machine are shown with certain mechanical apparatus being diagrammatically illustrated. Thus, there will be seen a pair of conductors L1 and L2 which lead from a conventional electrical power supply (not shown) and are adapted to supply current to energize the motors M1, M2, M3 and M4. In addition to these two conductors, there are a pair of relays RM5 and RM6 and a group of solenoids S1, S2, S3, S4, S5, S6, S7, S8 and S9. The conductors L1 and L2 are also adapted to supply power to the electrical safety circuit which is shown in FIG. 17 of the aforementioned patent application Ser. No. 314,706. Such safety circuit comprises relays RM1, RM2, RM3 and RM4, and they are identified herein in correspondence with the reference characters that are applied to corresponding relays in said patent application. The relay RM1 is provided with a connection to a conventional sensing device (not shown). Such sensing device is associated with the motor M1 as described in said aforementioned application and serve to operate the relay RM1 when the load on the motor M1 rises above a predetermined value.

The motor M1 as previously explained is adapted to drive the grinding wheel 14 and power thereto is applied by connecting the motor across leads L1 and L2 through the contacts of a normally closed switch SW1 and the contacts of a normally open switch SW2. The switches SW1 and SW2 are momentarily operated push-button switches whose operating buttons are mounted on the control console 94 in the operator's cab 54 in order that they are readily accessible to the operator of the grinding machine. A switch 1M is operated on energization of the motor M1 and serves to maintain the motor in operation after manual release of the switch SW2.

The motor M2 is connected to drive the fluid pump 52 as illustrated by the broken line A in FIG. 2, and the pump 52, in turn, is adapted to supply fluid under pressure to the fluid motor 50. The latter is arranged in an hydraulic circuit which is indicated generally at 200 and serves to control the movement of the carriage 46. Electrical power to the motor M2 is applied by connecting the motor across the leads L1 and L2 under control of the normally closed contacts of a push-button switch SW8 and the normally open contacts of a push-button switch SW9. The switches SW8 and SW9 are momentarily operated push-button switches whose operating buttons are mounted on the control console 94. A switch 2M is operated on energization of the motor M2 and serves to maintain the motor M2 in operation after release of switch SW9.

The motor M3 drives the variable volume hydraulic pump 66 and the fixed volume pump 66a as indicated by the broken line B in FIG. 2. The pump 66 is connected to supply fluid under pressure to an hydraulic circuit which is indicated generally at 210 and serves to effect traverse of the boom carriage 32 across the width of the billet 10. The pump 66a is adapted to supply fluid under fixed pressure to an hydraulic circuit which is indicated generally at 220 and serves to control the vertical movement of the grinding wheel 14 while the pump 66 serves to supply additional fluid to the circuit 220 for maintaining the wheel in engagement with the billet 10 under a desired degree of additional pressure.

Power to the motor M3 is supplied by connecting the motor across leads L1 and L2 through the normally closed contacts of a push-button switch SW10 and the normally open contacts of a push-button switch SW11, the operating buttons of said two switches being mounted on the console 94.

The solenoid S1 and the relay RM5 are connected in parallel across the conductors L1 and L2 over a lead L3 on closure of the normally open contacts of a switch SW4 and through the normally closed contacts of a switch SW5 to energize the solenoid S1 and the relay RM5 simultaneously. The solenoid S2 and the relay RM6 are connected in parallel across the conductors L1 and L2 over a lead L4 on closure of the normally open contacts of a switch SW7 and through normally closed contacts of a switch SW6. The solenoid S1 is adapted to control the hydraulic circuit 200 to drive the operator's carriage 46 together with the boom carriage 32 and the wheel 14 longitudinally to the right along the billet as seen in FIG. 1. The solenoid S2 on the other hand controls the hydraulic circuit 200 to drive the carriages and the wheel 14 in the opposite direction.

The switches SW4 and SW6 are ganged together so that the operate together under control of the pedal 90 in the operator's cab 54. The switches SW5 and SW7 are likewise ganged together so that they operate together under control of the pedal 92 in the cab. The operation of the switch SW6 prevents energization of the solenoid S2 and the relay RM6 in the event the switch SW7 is also operated. Operation of the switch SW5 prevents energization of the solenoid S1 and the relay RM5 in the event the switch SW4 is also operated. This prevents the simultaneous operation of the solenoids S1 and S2 or the relays RM5 and RM6.

The relays RM5 and RM6 are timing relays each having normally open contacts 1 and 2. The number 1 contacts of the relay RM5 and the number 2 contacts of the relay RM6 are each adapted to open on de-energization of the respective relay only after a time delay. The operation of the relay RM5 immediately after the release of the relay RM6 therefore completes a momentary circuit through the slow-to-release number 2 of the contacts, relay RM6, the number 2 contacts of the relay RM5, and also through the lead L5 to the solenoids S3 and S4. Likewise, operation of the relay RM6 immediately after release of the relay RM5 completes a momentary circuit to the solenoids S3 and S4 through the number 1 contacts of the relay RM6, the slow-to-release number 1 contacts of the relay RM5 and the lead L5, whereafter, the number 1 contacts of the relay RM5 open to restore the solenoids S3 and S4. Said solenoids S3 and S4 are, therefore, energized whenever the direction of travel of the operator's carriage is subject to immediate reversal for the purpose of preventing shock and cavitation in the hydraulic circuit 200, as will be explained more in detail hereafter.

The solenoid S5 is energized over a lead L6 on closure of the normally open contacts of a switch SW12. Such switch SW12 is a toggle or lever operated switch which is located at the console 94 and is closed when the lever is thrown in one direction. A set of normally open contacts on a switch SW13 are ganged with the switch SW12 and remain open when the lever is operated in one direction to close the switch SW12. The contacts of the switch SW13 are closed, however, in order to energize the solenoid S6 over a lead L7 when the lever is thrown in the opposite direction. In such case, the contacts of the switch SW12 remain open. Thus, the solenoids S5 and S6 can only be energized alternatively, the solenoid S5 being adapted to control the hydraulic circuit 210 to move the boom carriage assembly 32 toward the operator's cab 46 and the solenoid being adapted to control the circuit 210 to move the boom carriage assembly 32 in the opposite direction.

The solenoid S7 is energized over a conductor L8 on closure of the normally open contacts of a switch SW15 on the console 94. Another set of normally open contacts of a switch SW14 are also operated with the switch SW15 for simultaneously energizing the solenoid S6. The switches SW14 and SW15 are provided with a conventional time-delay apparatus such as a bellows for a purpose to be later explained. This prevents the immediate release of the solenoids S6 and S7 on release of the manual pressure that is applied to operate the switches SW14 and SW15. The solenoid S7 is adapted to control the metering valve 96 in the hydraulic circuit 210 so that the boom carriage assembly moves only a predetermined increment.

The solenoids S8 and S9 and the relays RM3 and RM4 are adapted to be energized after the closure of the normally open contacts of a toggle or lever operated switch SW16. The solenoid S8 is energized over a lead L9 if the normally open number 2 contacts of the relay RM2 are closed in conjunction with the operation of the switch SW16, while the solenoid S9 is adapted to be operated over a lead L10 only if the normally closed number 1 contacts of the relay RM4 are closed while the switch SW16 is operated. The solenoid S9 is adapted to control the hydraulic circuit 220 for lowering the grinding wheel 14 into engagement with the billet 10 while the solenoid S8 is adapted to add fluid pressure to the hydraulic circuit 220 in the event that the back pressure on the wheel 14 exceeds a predetermined value.

The relays RM3 and RM4 are in the safety circuit that is described in detail in aforementioned patent No. 3,253,-368. The relay RM3 is operated in response to the operation of the relay RM2 if the switch SW16 is closed while the relay RM4 is operated in response to the subsequent release of the relay RM2. The relay RM2 is, in turn, operated by the sensing relay RM1.

The relay RM1 is operated whenever the load or pressure on the grinding wheel is increased beyond a predetermined value since this causes a current increase through the motor M1. This current increase is detected by the relay RM1 as described in said patent application. The relay RM1 thus operates whenever the load on the motor M1 increases beyond a predetermined value and on the other hand releases in accordance with conventional design whenever the load on the motor M1 falls to another predetermined value below the original value that is necessary to operate the relay RM1. This other value may, for example, be 85% of the value necessary to operate the relay RM1.

The relay RM2 is operated whenever the relay RM1 is energized to an extent sufficient for the relay RM1 to close its normally open contacts. Said relay RM2, therefore, follows the operation of the relay RM1. The relay RM2 at its number 1 contacts is adapted to open an incomplete circuit to the relay RM4. At its number 2 contacts, the relay RM2 is adapted to prepare or complete the previously mentioned circuit to the solenoid S8 with the switch SW16, of course, closed. At contacts 3, the relay RM2 completes a circuit to the relay RM3, if the switch SW16 is closed.

The relay RM3 prepares a circuit to the relay RM4 at its number 1 contacts and locks operated through the switch SW16 at its number 2 contacts. With the number 1 contacts of the relay RM3 closed, the subsequent release of the relay RM2 enables the completion of a circuit to the relay RM4.

The relay RM1 releases in response to the drop in the load or back pressure on the grinding wheel 14 such as occurs on the previously mentioned drop off causing the described current change in the motor M1. The relay RM2, therefore, restores to open its number 2 contacts and also restores the solenoid S8. The relay RM3 now restores. However, since its number 1 contacts are slowto-release, a circuit is completed to the relay RM4 through the switch SW16 and number 1 contacts of the relay RM2. The relay RM4 now operates to open the circuit to the solenoid S9 at its number 1 contacts and at its number 2 contacts locks operated through the switch SW16. The relay RM4 remains operated to prevent operation of the solenoid S9 until the operator of the grinding machine restores the switch SW16. Thus, the solenoid S9 is adapted to be energized in response to the initial closure of the switch SW16 for lowering the wheel 14 into engagement with the billet 10. The solenoid S8 is adapted to be subsequently energized only when the relay RM2 is energized. Release of the relay RM2 thereafter causes restoration of the solenoids S8 and S9, and prevents their reoperation until the switch SW16 is first released and then reoperated.

*Hydraulic circuit 200*

The hydraulic circuit 200 includes a directional valve DV1 to which fluid under pressure is supplied through a conduit C1 from the pump 52. The directional valve DV1 is adapted to connect the conduit C1 to either of two conduits C3 or C4 to drive the fluid motor 50 in either of two directions lengthwise along the billet. A conventional pressure compensating valve PCV whose setting is controlled by a manually adjustable valve MV regulates the pressure in the conduit C1 and serves to control the speed at which the motor 50 is to be driven by the fluid pressure that is supplied to it by the pump 52, as will become apparent.

The valve DV1 is controlled by the solenoids S1 and S2 and with both of these two solenoids S1 and S2 de-energized, the conduit C1 is connected to a conduit C2. The latter extends directly back to a fluid supply S through a directional valve DV2 that is controlled by the solenoid S3. The conduit C2 is also connected to the supply S through a relief valve RV1.

The relief valve RV1 is controlled by a directional valve DV3 which, in turn, is adapted to be operated by the solenoid S4. When the valve DV3 is operated by the solenoid S4 to control the valve RV1, the usual or standard spring of the valve RV1 is rendered effective to regulate the fluid flow therethrough. The valves RV1 and DV3 are unitary structures and each comprises a conventional type of solenoid vented relief valve structure. The valve DV2 is similar in construction to the valves RV1 and DV3.

The conduit C2 is connected intermediate two check valves CV1 and CV2. The check valve CV1 is arranged to permit flow of fluid under pressure from the conduit C2 to the conduit C3 in the event that the pressure in the conduit C3 is low and the passage of fluid from the conduit C2 to the supply S is blocked by the valve DV2. Likewise, the check valve CV2 permits fluid under pressure to flow from the conduit C2 to the conduit C4 in the event that the pressure in the conduit C4 is low and the passage from the conduit C2 to the supply S is blocked by the valve DV2. This aids in preventing shock and cavitation in the system 20 in response to a reversal in the direction in which the motor 50 is operated.

The fluid motor 50 is connected between the conduits C3 and C4 which are, in turn, adapted to be alternatively connected to the conduits C1 and C2 through the valve DV1 on operation of a respective one of the solenoids S1 or S2. The fluid motor 50 is thus driven in a direction corresponding to which one of the conduits C3 or C4 is connected through the valve DV1 to the conduit C1, while the other conduit is then connected to the conduit C2 and serves as a relief passage.

Two check valves CV3 and CV4 are connected to the conduits C3 and C4, respectively, in a direction to permit fluid pressure flow therefrom if the pressure in the conduits becomes high. The check valves C3 and C4 are connected in common over a conduit C5 to a relief valve RV2 which is adapted to flow or pass fluid under pressure to the supply S through the valve DV2.

With the solenoid S1 energized, the conduit C1 is connected to the conduit C4 and pressure fluid is applied to the fluid motor 50 for driving in one direction the motor 50 and, consequently, the operator's carriage 46, the tailstock 40, the boom carriage assembly 32, and the grinding wheel 14 to the right along the billet 10, as seen in FIG. 1. The pressure fluid is then relieved through the valve DV2 and also the conduits C3 and C2 which are connected in tandem through the valve DV1.

If the solenoid S2 is energized instead of the solenoid S1, the conduit C1 is connected to the conduit C3 and fluid under pressure is applied to the fluid motor 50 so as to drive it, as well as the other principal parts of the grinding machine, in the reverse direction, that is, to the left along the billet as seen in FIG. 1. The pressure fluid is then relieved through the valve DV2 and also the conduits C4 and C2 which are connected in tandem through the valve DV1.

Since driving the motor 50 in either direction may involve immediate reversal in the direction in which the fluid motor 50 has been previously driven, the inertia of the grinder as a whole may result in cavitation and shock in the system. To avoid this result, the solenoids S3 and S4 are momentarily energized if either the solenoid S1 or the solenoid S2 is energized immediately after the de-energization of the other solenoid as previously explained. Therefore, on reversal in the direction of drive or operation of the motor 50 immediately following its operation in either direction, the valves DV2 and DV3 are operated for a time dependent on the release time of the slow-to-release contacts 1 and 2, respectively, of the relays RM5 and RM6.

Thus, when the valve DV1 initially operates on energization of the solenoid S2, for example, to switch the conduit C1 from the conduit C4 to the conduit C3. The pressure in the conduit C4 may become quite low as the motor 50 continues to exhaust the conduit C4 while building up pressure in the conduit C3. Thus, the initial fluid back pressure in the conduit C3 tends to bring the motor 50 to a halt as soon as possible and brake movement of the grinding machine as a whole. The increased pressure in the conduit C3 in the meantime flows through the check valve CV3 and thence through the conduit C5 to the relief valve RV2 and back into the conduit C2 since the solenoid S3 is operated to switch the valve DV2 and block the relief conduit C2. Excessive pressure in the conduit C5 is relieved through the valve RV2 to the fluid supply or source S through the conduit C6.

Since pressure in the conduit C2 may now exceed the low pressure in the conduit C4, pressure fluid flow through the check valve CV2 to the conduit C4 occurs to equalize the pressure. Now as the fluid motor 50 begins to reverse its direction of operation in response to the fluid under pressure in the conduit C3, the pressure in the conduits C4 and C2 builds up. The valve RV1 during this period serves to relieve excess pressure in the conduit C2 through the conduit C7 under control of the valve DV3 and the solenoid S4 since the valve DV3 blocks the passage C8. Thereafter, the solenoids S3 and S4 are restored as heretofore explained and the motor 50 is driven in the desired direction under the pressure fluid that is applied through the conduits C1 and C3 and at a speed that is determined by the setting of the valve MV.

If now it is again desired immediately to reverse the direction of movement of the operator's carriage 46 and associated parts, the conduit C3 is switched from the conduit C1 and connected to the conduit C2, while the conduit C3 is connected to the conduit C1 on energization of the solenoid S1. Pressure consequently falls in the conduit C3 and rises in the conduit C4. The solenoids S3 and S4 again switch valves DV2 and DV3, as previously explained, and the same operation for preventing shock and cavitation again takes place except that the excess pressure in the conduit C4 flows through the check valve CV4 to the valve RV2 while the conduit C2 supplies pressure fluid to the conduit C3 through the valve CV1.

*Hydraulic circuit 210*

The hydraulic circuit 210 includes a pair of directional valves DV4 and DV5 for controlling fluid pressure at the cylinders 70 and at the metering valve 96. The valve DV4 is controlled by the solenoids S5 and S6 and fluid under pressure is supplied thereto over a conduit C10 from the pump 66. The valve DV5 is controlled by the solenoid S7.

The metering cylinder 96 has slidably mounted therein the aforementioned piston 212 with its piston rod 97. The limits of travel of the piston 212 in the metering cylinder are set by means of the adjustable screw 98 so that the piston 212 may move through a selected distance only. The piston 212 is a differential area piston with the larger area side exposed directly to the fluid under pressure in the conduit C10 and the smaller area side (side with the piston rod 97 projecting therefrom) exposed to the fluid under pressure in a conduit C12.

The conduit C12 is connected to the conduit C10 through the valve DV5. The force on the piston 212 is, therefore, greater on the side that is exposed directly to the conduit C10 and the piston 212 is moved in the direction of the adjustable screw 98 as far as permitted by the adjustment of said screw to one limit position. If the force on the smaller area side of the piston 212 exceeds that on the larger area side, the piston 212 is moved in the opposite direction (indicated by the arrow in FIG. 2) until it encounters the imperforate end wall of the metering cylinder 96. Therefore, the total travel of the piston 212 is controlled by the setting of the screw 98. The metering cylinder 96, the piston 212, and the various associated parts constitute, in effect, a metering valve.

The conduit C12 is also connected to one side of the pistons 168 in the cylinders 70. The pistons 168 are also differential area pistons with the smaller area sides exposed to the pressure in the conduit C12 and the larger area sides exposed to the pressure in a conduit C14. The conduit C14 is connected to the valve DV4 and when the solenoids S5 and C6 are deenergized, this conduit C14 is blocked.

When the solenoid S6 is energized, the conduit C10 is connected directly to the conduit C14 so that the larger area sides of the pistons 168 are exposed to the pressure fluid therein. The smaller area sides of the pistons 168 are also exposed to the pressure in the conduit C10 through the conduit C12. However, since the total force on the larger area sides of the pistons 168 is greater, the cylinders 70 move away from the operator's cab 54 and in the direction of the tailstock 40 to carry the boom carriage assembly 32 and the grinding wheel 14 in that direction. When the solenoid S6 is deenergized, the conduit C14 is disconnected from the conduit C10 and the force on both sides of the pistons 168 is equalized to maintain the boom carriage assembly 32 in the position to which it has been moved.

If the solenoid S7 is energized together with the solenoid S6, the conduit C12 is disconnected from the conduit C10 at the valve DV5 and both are blocked. The conduit C10 is also connected through the valve DV4 to the conduit C14 so that the pressure fluid therein drives the cylinders 70 and resultantly the boom carriage-assembly 32 in the direction of the tailstock 40. The fluid under pressure is extended through the pistons 168 and the conduit C12 and applied to the smaller area sides of the pistons 212. Since the combined areas of the pistons 168 is considerably greater than the larger area side of the piston 212, the pressure in the conduit C12 is sufficient to force the piston 212 in the direction indicated by the arrow in FIG. 2. The piston 212 moves until it engages the imperforate end wall of the metering cylinder 96, whereupon further movement of the cylinders 70 and the piston 212 is terminated. The cylinders 70, therefore, move only a distance that corresponds to the volume of fluid that is permitted in the metering cylinder 96 by the screw-adjusted setting of the piston 212 to index the boom carriage assembly 32 and the wheel 14 a corresponding predetermined increment transversely across the billet 10.

When the solenoids S6 and S7 are deenergized, the conduits C10 and C12 are reconnected through the valve DV5 while the conduit C14 is blocked. The cylinders 70, therefore, remain in position, but the piston 212 in the metering cylinder 96 moves towards its home position and is thus prepared for another predetermined indexing of the cylinders 70 and their associated parts including the boom carriage assembly 32.

Energization of the solenoid S5 controls the valve DV4 to block the conduit C10 at the valve DV4 and to connect the conduit C14 to the fluid supply S. Under these circumstances, the pressure fluid that is extended from the conduit C10 to the conduit C12 and exerted against the smaller area sides of the pistons 168 is effective to move the cylinders 70 in the direction of the cab 54 on the operator's carriage 46 as the pressure in the conduit C14 is relieved or exhausted to the supply S. Thus, the boom carriage assembly 32 and the grinding wheel 14 are carried towards the cab 54.

*Hydraulic circuit 220*

The hydraulic circuit 220 includes a pair of directional valves DV6 and DV7 under the control of the solenoids S8 and S9, respectively. The valve DV6 is fed by the pump 66 through a branch conduit C16 on the conduit C10, while the valve DV7 is fed by a conduit C18 from the fixed volume pump 66a. The conduit C18 is connected to the valve DV7 through a conventional speed control valve PCV1 which is adjusted in a conventional manner to regulate the fluid under pressure passing to the valve DV7 through an intermediate conduit C19. A by-pass path back to the supply is provided between the valve PCV1 and the pump 66a by a pressure relief valve RV3. The valve RV3 serves to protect the pump 66a.

The valve DV7 normally connects the fluid under pressure from the pump 66a over or through a conduit C20 including a flexible connection to the smaller area side of the piston 63 in the boom cylinder 60. The piston 63 is adapted to displace the cylinder 60 in response to the application of pressure fluid thereto. A check valve CV5 is connected between the conduit C20 and the fluid supply S so that if pressure in the conduit C20 becomes too low, fluid may be drawn from the supply. The larger area side of the piston 63 is connected to the fluid supply S via a flexible conduit C22 and the valve DV7. A relief valve RV4 connects the conduit C22 to the fluid supply S. The valve RV4 may be set to control the pressure in the conduit C22 at a desired level to regulate the maximum allowable grinding pressure that is applied to the wheel 14.

With the solenoid S9 deenergized, the pressure fluid that is applied from the conduit C19 through the conduit C20 is effective against the smaller area side of the piston 63 to move the cylinder 60 in the direction of the arrow in FIG. 2 and thereby maintain the grinding wheel 14 out of engagement with the billet 10. The wheel 14 is thus placed in its upper limit position.

Energization of the solenoid S9 serves to connect a conduit C20 to the fluid supply S and also to connect the conduit C22 to the source of regulated pressure fluid through the conduits C19 and C18. Pressure fluid is, therefore, applied from the fixed volume pump 66a against the larger area side of the piston 63 to lower the boom 18 and the wheel 14 at a fixed rate governed by the setting of the valve PCV1.

When the grinding wheel 14 encounters the workpiece or billet 10 and the motor M1 is energized, the motor M1 rotates the grinding wheel to grind the upper surface of the billet. As the wheel 14 encounters the billet, the back pressure or load on the wheel 14 increases thereby causing the motor M1 to draw additional current. As the motor M1 draws more current, the sensing device previously mentioned senses this condition and operates to energize the relay RM1 which, in turn, energizes the relay RM2. The relay RM2 energizes the solenoid S8 which, in turn, connects the branch conduit C16 from the variable volume pump 66 to the conduit C22 and thereby serves to apply additional pressure against the cylinder 60 with the result that the wheel 14 is held engaged with the billet and is caused to follow dips or low spots in the billet. Thereafter, the solenoid S8 is maintained energized, since the relays RM1 and RM2 remain energized unless the load on the motor M1 falls substantially below the value necessary to energize the relay RM1.

When the grinding wheel 14 encounters a high spot on the billet, the back pressure on the wheel 14 will increase thereby building up pressure in the conduit C22. It is contemplated that this excess pressure will be exhausted through the valve RV4. As the pressure on the wheel increases, however, the wheel may be raised to force the cylinder 60 upwards. As the cylinder 60 moves upward, it creates a greater volume adjacent to the smaller area side of the piston 63 so that a partial vacuum is formed. The check valve CV5 then opens to permit the necessary fluid to flow from the supply or source S in order to eliminate the vacuum. The valve CV5 is located below the fluid (oil) level in the supply S and may, for example, be set to pass fluid when the pressure thereon exceeds 1 or 2 p.s.i.

If the grinding wheel 14 in following the billet 10 comes to the end of the billet and then drops off, the relay RM1 will, under the pressure that is applied through the conduit C22 to the piston 63, restore as soon as the load on the motor M1 falls below the value necessary to maintain the relay RM1 energized. The relay RM2 will, therefore, de-energize and, in turn, de-energize the solenoid S8 and energize the relay RM4 as previously explained. The relay RM4 restores the solenoid S9 and the valve DV7 now supplies fluid under pressure from the pump 66a to the conduit C20 while connecting the conduit C22 to the fluid supply S. The fluid under pressure in the conduit C20 is applied against the smaller area side of the piston 63 and causes raising of the boom 18 and the grinding wheel 14 to their upper limit position.

Grinding machine operation

Initially, the grinding machine operator in the cab 54 may desire to position the grinding wheel 14 over one portion of the billet 10 and then begin grinding the billet. In such case, the switch SW9 is momentarily operated to energize the motor M2 that drives the fluid pump 52. The switch SW11 is also momentarily operated to energize the motor M3 that drives the fluid pumps 66 and 66a.

In order to move the grinding machine as a whole to the left as seen in FIG. 1, the operator operates the foot pedal 92 to close the switch SW7 and open the switch SW5, or if it is desired to move the machine to the right as seen in FIG. 1, the operator operates the foot pedal 90 to close the switch SW4 and open switch SW6 as heretofore pointed out. Closing of the switch SW7 energizes the solenoid S2 and the relay RM6, the latter being immaterial if the relay RM5 has not been energized immediately prior thereto. When the solenoid S2 is energized, the conduit C1 is connected to the conduit C3 and the fluid motor 50 is driven in one direction for moving the machine to the left along the billet 10 as seen in FIG. 1. When the desired position is approached, the manual pressure on the pedal 92 is relieved and the switch SW7 is opened to de-energize the solenoid S2.

If the operator desires to move the boom carriage assembly to the left as seen in FIG. 1 or in the event he desires to brake the carriage or has overshot the desired position, he will close the switch SW4 to energize the solenoid S1. In the event this occurs immediately after the relay RM6 has been deenergized and while its number 2 contacts are still closed, the relay RM5 will momentarily energize the solenoids S3 and S4, as previously explained, to avoid shock and cavitation during reversal of the driving movement of the fluid motor 50. The solenoid S1 automatically energizes and results in the conduit C1 becoming connected to the conduit C4 and the fluid motor 50 to the end that the machine as a whole moves to the left. The switches SW4 and SW7 may thus be operated either to effect bodily movement of the grinding wheel 14 longitudinally along the billet 10, or to achieve a braking effect in that movement.

The operator may now desire to move the boom carriage assembly 32 outwardly of the carriage 46 and the operator's cap 54 and for that purpose, he throws the lever for closing the switch SW13 in order to energize the solenoid S6. Such solenoid when energized connects the conduit C10 to the conduit C14 and results in application of fluid under pressure from the pump 66 against the larger area sides of the pistons 168. This causes the cylinders 70 together with the boom carriage assembly 32 and the grinding wheel 14 to move outwardly towards the wheel-equipped tailstock 40. On reaching the desired position or extent of movement, the switch SW13 is opened in order to restore the solenoid S6 and thereby disconnect the conduit C10 from the conduit C12. The operator may also terminate movement before reaching the desired position and then index the boom carriage assembly 32 to the desired position by energizing the solenoids S6 and S7 together in successive time periods.

If the operator has overshot the desired position of movement of the boom carriage assembly, he simply operates the switch SW12 to energize the solenoid S5. This connects the conduit C14 to the fluid supply S so that the fluid under pressure that is supplied through the conduits C10 and C12 and against the smaller area sides of the pistons 168 serves to move the cylinders 70 together with the boom carriage assembly 32 and the grinding wheel 14 toward the carriage 46 until the desired position is reached. On or before reaching the desired position, the motor M1 is energized by momentary operation of the switch SW2 whereupon it closes the contacts 1M to hold itself energized. The motor M1 now drives the wheel 14 at idling speed.

Now, in order to lower the wheel 14 into engagement with the billet 10, the operator throws the lever for closing the switch SW16. This energizes the solenoid S9 by extending power over the number 1 contacts of the relay RM4 and the lead L10. When the solenoid S9 is energized, it controls the valve DV7 so as to connect fluid under fixed pressure from the conduit C19 to the conduit C22 and thence to the large area side of the piston 63. This results in downward movement of the cylinder 60, the boom 18 and the grinding wheel 14 until the wheel is brought into engagement with the upper surface of the billet 10. Thereafter, the current in the motor M1 builds up beyond a predetermined value in response to an increased load thereon as previously explained, and the relay RM1 energizes to in turn energize the relay RM2. The wheel 14 may now be driven by the motor M1 at a desired grinding speed through the medium of the variable speed transmission unit 26.

At its number 2 contacts, the relay RM2, in the meantime, energizes the solenoid S8 and at the number 3 contacts of the relay RM2, a circuit is completed to the relay RM3 from the lead L1, the switch SW16, and the lead L2. The relay RM3 is then locked operated as already explained. Energization of the solenoid S8 controls the valve DV6 causes additional fluid under pressure to be supplied to the valve DV7 and the conduit C22 as previously explained for maintaining the proper pressure on the grinding wheel 14.

As the wheel 14 comes into contact with the billet 10, the operator controls one of the foot pedals 90 or 92 to close either of the two switches SW4 or SW7 depending on the direction in which the grinding pass is to proceed. A corresponding one of the two solenoids S1 or S2 is, therefore, energized and it in turn results in application of fluid under pressure through the valve DV1 as explained for driving the grinding machine as a whole in a desired direction longitudinally along the billet to complete a grinding pass.

If the wheel 14 should tend to fall into a depression in the upper surface of the billet 10 during bodily movement thereof, the pressure on the wheel 14 is partially relieved to reduce the load on the motor M1. The relay RM1 does not release, however, until the load on the motor M1 falls to a level below that necessary to operate the relay RM1. The relay RM2 will, therefore, not release unless the pressure on the wheel 14 is considerably relieved such as occurs when the wheel 14 is completely free of the billet and drops off the billet at the end of a longitudinal pass. At that time, the grinding wheel 14 will be automatically raised as explained, but during the grinding pass, the relay RM1 is maintained energized to prevent the wheel from raising. If the wheel 14 should be automatically raised as explained, the switch SW16 must be restored and then reoperated to permit the wheel 14 again to be lowered into engagement with the upper surface of the billet as already explained.

The operator may during the grinding pass terminate movement of the machine longitudinally along the billet by simply removing pressure from the operated pedal 90 or 92 thereby to cause opening of the associated switch SW4 or SW7 depending on which switch is operated. The operator may also reverse the direction of travel or movement of the machine longitudinally with respect to the billet by operating the previously unoperated one of the two switches SW4 or SW7 as already explained. He may also operate the switch SW3 in order to effect sidewise rocking or oscillation of the grinding wheel 14 when the latter is in a position in which the boom carriage assembly 32 is halted as explained in said patent No. 3,253,368.

The operator may also index the grinding wheel 14 a predetermined distance in a direction away from the cab 54 by momentarily operating the switches SW14 and SW15 either before or at the end of a longitudinal grinding pass. As previously explained, operation of the switches SW14 and SW15 completes circuits over the leads L7 and L8 to the solenoids S6 and S7, respectively, to connect the conduit C14 to the conduit C10 and thereby block the conduit C12. The pressure fluid in the conduit C14 is applied against the large area sides of the pistons 168 and serves to move the cylinders 70 together with the boom carriage assembly 32 and the wheel 14 in the direction of the tailstock 40. The pressure is also effective at the metering cylinder 96, as previously explained, to move the piston 212 to its limit position whereupon movement of the cylinders 70, the boom carriage assembly, and the wheel is terminated. The grinding wheel 14, therefore, traverses only a predetermined portion of the billet in accordance with the setting of the screw 98 and another grinding pass may be taken along the billet in an area properly spaced for the preceding grinding pass. The piston 212 is then automatically returned to its home position as already explained and, therefore, is prepared for another boom carriage assembly indexing operation.

If the time delay arrangement for the switches SW14 and SW15 is omitted, the boom carriage assembly 32 will be indexed toward the tailstock for a distance comparable to the length of time the switches SW14 and SW15 are held operated since they then maintain the solenoids S6 and S7 energized for a corresponding period. In this case, if the switches SW14 and SW15 are released before the metering piston 212 reaches its limit position, the movement of the boom carriage assembly 32 and the grinding wheel 14 towards tailstock 40 will terminate immediately due to the release of the solenoid S6 and disconnection of the conduit C14 from the conduit C10. The piston 212 in the metering cylinder 96 will then return to its normal position under the influence of the fluid under pressure in the conduit C10.

If the operator desires to index the boom carriage assembly 32 an option distance toward the tailstock 40 in the midst of a grinding operation, he simply throws the lever for the switch SW13 into the position for closing the switch to energize the solenoid S6. The conduit C10 is then connected to the conduit C14 through the valve DV4 and the boom carriage assembly 32 resultantly moves toward the tailstock until such time as the switch SW13 is opened to de-energize the solenoid S6.

Likewise, if the operator desires to index the boom carriage assembly 32 an optional distance toward the carriage 46 and the cab 54 in the midst of a grinding operation, he simply closes the switch SW12 to energize the solenoid S5. This connects the conduit C14 to the fluid supply S and allows the pressure fluid in the conduit C12 to move the cylinders 70, the boom carriage assembly 32, and the grinding wheel 14 toward the cab until the operator opens the switch SW12 to restore the solenoid S5.

To terminate rotation of the grinding wheel when the grinding operation is completed, or before, the operator simply opens the switch SW1 momentarily. This de-energizes the motor M1 with resultant restoration of the contacts 1M. To halt the movement of the machine as a whole, the operator simply removes any pressure on the foot pedals to open either operated one of the two switches SW4 and SW7 and deenergize either the solenoid S1 or the solenoid S2 depending upon which was previously operated. The switch SW8 may also be momentarily operated to restore the motor M2 which releases its contact 2M and terminates operation of the fluid pump 52 in the event this is desired.

With restoration of the motor M1, the relay RM1 restores, if previously operated, to release the relay RM2. The relay RM2 closes its number 1 contacts to energize the relay RM4 over the number 1 contacts of the relay RM3. The relay RM4 opens its number 1 contacts to deenergize the solenoid S9. At its number 2 contacts, the relay RM2 deenergizes the solenoid S8. With the solenoid S9 denergized, the valve DV7 connects the conduit C20 to the pressure fluid that is supplied by the pump 66a and the grinding wheel 14 is resultantly raised to its limit position as heretofore explained. Thereafter, the operator restores the switch SW16 to deenergize the relay RM4.

At the switch SW10 the operator momentarily opens the circuit to the motor M3, and this deenergizes to open at contact 3M and terminate operation of the pumps 66 and 66a.

The foregoing constitutes a description of the various electrical and hydraulic circuits that are utilized for achieving improved grinding machine operation.

The invention is not to be understood as limited or restricted to the precise details set forth, since these may be modified within the scope of the appended claims without departing from the spirit and scope of the invention.

Having thus described the invention what we claim as new and desire to secure by Letters Patent is:

1. A system for controllling a grinding machine of the type having a movable carriage adapted to be tranversed across a billet whose surface is adapted to be ground by a grinding wheel pivotally suspended above said billet by said carriage and wherein fluid responsive means are provided for either lowering said wheel into engagement with said billet or raising said wheel from said billet with said wheel adapted to be rotatably driven for grinding said billet surface, the improvement comprising optionally operable means for automatically controlling said fluid responsive means for lowering said wheel into engagement with said billet under a predetermined pressure, means operable responsive to said wheel, being both driven and engaged with said billet surface under said pressure for thereafter automatically increasing the pressure engaging said wheel against said billet surface, and means controlled by said pressure increasing means for thereafter automatically raising said wheel above said billet in the event said wheel is disengaged from said billet.

2. A system for controlling a grinding machine of the type having a movable carriage adapted to be traversed across a billet whose surface is adapted to be ground by a grinding wheel pivotally suspended above said billet by said carriage and wherein fluid responsive means are provided for either lowering said wheel into engagement with said billet or raising said wheel from said billet with said wheel adapted to be rotatably driven for grinding said billet surface, the improvement comprising optionally operable means for automatically controlling said fluid responsive means for lowering said wheel into engagement with said billet under a predetermined pressure, means operable responsive to said wheel being both driven and engaged with said billet surface under said pressure for thereafter automatically increasing the pressure engaging said wheel against said billet surface, means thereafter controlled by said pressure increasing means for automatically raising said wheel above said billet in the event the pressure between said wheel and billet falls below a certain value and optionally operable means for moving said carriage and wheel a predetermined increment across said billet.

3. An arrangement for controlling the movement of a grinding wheel adapted to be carried by a boom either into or out of engagement with a workpiece and having a motor adapted to rotate said wheel while said wheel is traversed across the surface of said workpiece for grinding said workpiece, the improvement comprising a source of fixed fluid pressure, a first directional valve connected to said source, a solenoid for controlling said first valve, a second source of fluid pressure for supplying additional fluid pressure, a second normally closed directional valve connected between said second source and said first valve, another solenoid adapted to be energized for controlling said second valve to connect said second source to said first valve, fluid responsive means adapted to move said boom in one direction for engaging said wheel with said workpiece and for moving said boom in another direction for disengaging said wheel from said workpiece, means for operating said first solenoid to control said first valve to connect said fixed pressure to said means for moving said boom in said one direction to engage said wheel with said workpiece, and electrical means operable in response to the engagement of said wheel with said workpiece while rotated by said motor for automatically operating said other solenoid to open said second valve for connecting said second source of additional pressure through said first valve to said fluid responsive means for increasing the pressure of said wheel against said workpiece.

4. The arrangement claimed in claim 3 and in which said electrical means is thereafter operable for rendering said first and second solenoids inoperative to control said first valve to connect said fixed source to said fluid responsive means for moving said boom in said other direction for raising said wheel from said workpiece while closing said second valve.

5. The arrangement claimed in claim 3 and including, additionally, means connected to said second source of fluid pressure for indexing said wheel a predetermined increment in one direction across said workpiece.

6. In an arrangement for controlling the movement of a grinding wheel carried by a pivotally supported boom either into or out of engagement with a workpiece and having a motor adapted to rotate said wheel while said wheel is traversed across the surface of said workpiece for grinding said workpiece, the improvement comprising a source of fixed fluid pressure, a first directional valve connected to said source, a solenoid for controlling said first valve, a second source of fluid pressure for supplying additional fluid pressure, a second normally closed directional valve connected between said second source and said first valve, another solenoid adapted to be energized for controlling said second valve to connect said second source to said first valve, a reaction cylinder pivotally connected to said boom and having a differential area piston pivotally connected to a support, a conduit normally connected through said first valve to said source of fixed pressure for applying said fixed pressure against the smaller area of said piston whereby said cylinder and boom are moved in one direction to carry said wheel out of engagement with said workpiece, a last conduit connected between said first valve and the larger area of said piston and adapted to be connected to said source of fixed pressure by said first valve on energization of said one solenoid for driving said cylinder and boom in another direction to engage said wheel with said workpiece, and electrical means operable in response to the operation of said wheel motor and the engagement of said wheel with said workpiece for automatically energizing said other solenoid to open said second valve for connecting said second source of additional fluid pressure through said first valve to said last conduit for increasing the pressure engaging said wheel against said workpiece.

7. In a system for controlling a grinding machine of the type having a movable carriage adapted to be reciprocated by a reversible fluid driven motor along a billet whose surface is adapted to be ground by a grinding wheel suspended by said carriage above said billet and which is adapted to be either lowered into engagement with said billet or raised from said billet and which is adapted to be traversed across the width of said billet, the improvement comprising optionally operable means for applying a predetermined fluid pressure for lowering said wheel into engagement with said billet, last means operated responsive to said wheel engaging said billet for placing said wheel under increased fluid pressure against said billet, means operated by said last means for controlling the application of said fluid pressure to raise said wheel from said billet in the event said wheel is disengaged from said billet, optionally operable means for moving said wheel a predetermined increment across said billet, and means for adjusting the rate of flow of fluid to said fluid motor for regulating the speed at which said carriage and wheel are moved along said billet.

8. In an arrangement for moving a grinding machine carriage carrying a grinding wheel, the improvement comprising a source of fluid pressure, a fluid motor adapted to be operated in either of two directions, a pair of conduits adapted to be selectively interconnected between said source and said motor and between said motor and a fluid supply for applying fluid in a respective direction to said motor for moving said carriage and wheel accordingly, electrical means for selecting either one of said conduits to be interconnected between said source and said motor, and for automatically disengaging the other conduit from said source and connecting said other conduit to said supply, and last means comprising a relay having slow-to-release contacts and being automatically operable in the event one of said conduits is selected within a predetermined time period after the other conduit is disengaged from said source for supplying fluid to said other conduit to prevent cavitation.

9. In an arrangement wherein a grinding machine having a grinding wheel suspended from a support and adapted to be moved in one direction for engagement with a workpiece and in another direction for disengagement from said workpiece, the improvement comprising a fluid motor adapted to be driven in either of two directions by fluid applied in a respective direction to said motor for moving said support in a respective direction along said workpiece, a source of fluid pressure, a directional valve connected to said source, a pair of conduits connected between said motor and said valve with each conduit adapted to supply fluid from said valve to said motor in a respective direction and to evacuate fluid from said motor, another directional valve, a relief conduit connected from said first valve to a fluid supply through said other directional valve, a check valve for each of said pair of conduits connected to pass fluid from said relief conduit to a respective one of said pair of conduits in response to a predetermined pressure difference between a respective one of said pair of conduits and relief conduit, a relief valve, a pair of check valves connected between a respective one of said pair of conduits and said relief valve for passing fluid from a respective one of said pair of conduits in response to a predetermined pressure for passage through said relief valve to said relief conduit in response to the operation of said other directional valve, a second relief valve connected between said relief conduit and said supply, a last direction valve adapted to be operated for controlling said second relief valve to prevent the relief therethrough at less than a certain pressure in said relief conduit, optionally operable means for controlling said first directional valve to selectively connect either one of said pair of conduits to said source while disengaging the other conduit from said source and engaging said other conduit with said relief conduit, and means operable in the event said optionally operable means is operated within a predetermined time after the other of said conduits is connected to said relief conduit for momentarily operating said other and last directional valves.

10. In an arrangement for controlling the movement of a grinding wheel carried by a pivotally supported boom either into or out of engagement with a workpiece and having a motor adapted to rotate said wheel while said wheel is traversed across the surface of said workpiece for grinding said workpiece, the improvement comprising a source of fixed fluid pressure, a first directional valve connected to said source, a solenoid for controlling said first valve, a second source of fluid pressure for supplying additional fluid pressure, a second normally closed directional valve connected between said second source and said first valve, another solenoid adapted to be energized for controlling said second valve to connect said second source to said first valve, a reaction cylinder pivotally connected to said boom and having a differential area piston pivotally connected to a support, a conduit normally connected through said first valve to said source of fixed pressure for applying said pressure against the smaller area of said piston whereby said cylinder and boom are moved in one direction to carry said wheel out of engagement with said workpiece, a last conduit connected between said first valve and the larger area of said piston and adapted to be connected to said source of fixed pressure by said first valve on energization of said one solenoid for driving said cylinder and boom in another direction to engage said wheel with said workpiece, electrical means operable in response to energization of said wheel motor and the engagement of said wheel with said workpiece for automatically energizing said other solenoid to connect said second source through said first valve to said last conduit for increasing the pressure of said wheel against said workpiece, and means operable in the event said wheel, boom and reaction cylinder are moved in said one direction against said increased pressure for supplying fluid to the smaller area of said piston.

References Cited

UNITED STATES PATENTS

| | | | |
|---|---|---|---|
| 2,269,697 | 1/1942 | Silven | 51—92 |
| 2,694,274 | 11/1954 | McGibbon | 51—35 |
| 2,769,280 | 11/1956 | Comstock | 51—47 X |
| 3,052,067 | 9/1962 | Dilks | 51—35 |
| 3,089,287 | 5/1963 | Dilks | 51—35 |
| 3,149,439 | 9/1964 | Beattie | 51—34 |
| 3,156,072 | 11/1964 | Boehme | 51—35 X |
| 3,172,240 | 3/1965 | Giardini | 51—165 X |

HAROLD D. WHITEHEAD, *Primary Examiner.*